(12) United States Patent
Dieberger et al.

(10) Patent No.: US 8,010,903 B2
(45) Date of Patent: Aug. 30, 2011

(54) SYSTEM AND METHOD FOR VISUALIZING AND NAVIGATING DYNAMIC CONTENT IN A GRAPHICAL USER INTERFACE

(75) Inventors: Andreas Dieberger, San Jose, CA (US); Dulce Beatriz Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 10/034,499

(22) Filed: Dec. 28, 2001

(65) Prior Publication Data
US 2003/0122874 A1  Jul. 3, 2003

(51) Int. Cl.
*G06F 3/00* (2006.01)
(52) U.S. Cl. ........ 715/764; 715/707; 715/711; 715/712; 715/715; 715/723; 715/758; 715/768; 715/853; 715/854
(58) Field of Classification Search .......... 715/758, 715/764, 712, 707, 711, 715, 723, 768, 853, 715/854
See application file for complete search history.

(56) References Cited

U.S. PATENT DOCUMENTS

| | | | |
|---|---|---|---|
| 5,521,841 A | 5/1996 | Arman et al. | 364/514 A |
| 5,821,945 A * | 10/1998 | Yeo et al. | 345/440 |
| 5,877,758 A * | 3/1999 | Seybold | 715/866 |
| 6,166,735 A | 12/2000 | Dom et al. | 345/339 |
| 6,625,624 B1 * | 9/2003 | Chen et al. | 707/204 |
| 6,646,652 B2 * | 11/2003 | Card et al. | 345/645 |
| 6,784,901 B1 * | 8/2004 | Harvey et al. | 715/757 |
| 6,982,708 B1 * | 1/2006 | Mah et al. | 345/418 |
| 2002/0140722 A1 * | 10/2002 | Ayyar et al. | 345/723 |
| 2004/0139396 A1 * | 7/2004 | Gelernter et al. | 715/515 |

OTHER PUBLICATIONS

Koike, Y., sugigura, A., Koseki, Y., "TimeSlider: an interface to specify time point", Proceedings of the ACM Symposium on User Interface Software and Technology, 10th Annual Sympsium, UIST'97, 1997, p. 43-44.*
Ahlberg, C., Shniederman, B. "The Alphaslider: a compact and rapid selector", CHI '94 Conference Proceedings, Human Factors in Computing Systems 'Celebrating Interdependence, 1994, p. 365-371.*
Richter, Heather a. et al., "AMulti-Scale Timeline Slider for Stream Visualization and Control", Georgia Institure of Technology Technical Report GIT-GVU TR 99-30, 1999, also available at ftp.cc.gatech.edu/pub/gvu/tr/1999/99-30.pdf.*
"Cue Video", www.almaden.ibm.com/cs/cuevideo/index.html, 1997.

(Continued)

*Primary Examiner* — Ryan F Pitaro
(74) *Attorney, Agent, or Firm* — Marc D. McSwain; Mohammed Kashef (57) ABSTRACT

A system and method for visualizing and navigating dynamic documents including data from an ongoing process and including instances of specified search terms. A summary view including a condensed abstract representation of a dynamic document provides a global overview of the distribution of search terms. The invention updates the document and aggregates the instances of search terms when the representation includes a nonlinear scale or uses multiple display regions having different resolution levels. The invention supports rapid skimming of dynamic documents and dynamic document collections, including enhancements triggered by cursor brushing, while keeping the user in context. Navigation to a segment of the dynamic document by selecting a corresponding portion of the summary view can replace the use of conventional scrolling techniques.

26 Claims, 4 Drawing Sheets

OTHER PUBLICATIONS

Koike, Y., Sugiura, A., Koseki, Y., "TimeSlider: an interface to specify time point", Proceedings of the ACM Symposium on User Interface Software and Technology, 10th Annual Symposium, UIST'97, 1997, p. 43-44.

Ahlberg, C., Shneiderman, B., "The Alphaslider: a compact and rapid selector", CHI '94 Conference Proceedings, Human Factors in Computing Systems 'Celebrating Interdependence', 1994, p. 365-371.

Furnas, G. W., "Generalized Fisheye Views", CHI '86 Conference Proceedings on Human Factors in Computing Systems, 1986, p. 16-23.

Richter, Heather A. et al., "A Multi-Scale Timeline Slider for Stream Visualization and Control", Georgia Institute of Technology Technical Report GIT-GVU TR 99-30, 1999, also available at ftp.cc.gatech.edu/pub/gvu/tr/1999/99-30.pdf.

Ponceleon, D. and Dieberger, A. "Hierarchical Brushing in a Collection of Video Data", Proceedings of the 34th Annual Hawaii International Conference on System Sciences, HICSS 34, Maui, HI, USA, Jan. 3-6, 2001.

* cited by examiner

SYSTEM AND METHOD FOR VISUALIZING AND NAVIGATING DYNAMIC CONTENT IN A GRAPHICAL USER INTERFACE

FIELD OF THE INVENTION

This invention relates to graphical user interfaces and more specifically to a system and method for visualizing and navigating dynamic content in a graphical user interface without requiring the use of conventional scrolling techniques.

DESCRIPTION OF RELATED APPLICATIONS

This application is related to two other commonly owned and concurrently filed applications, "System and Method for Visualizing and Navigating Content in a Graphical User Interface" U.S. patent application Ser. No. 10/034,300 and "Navigation Tool for Slide Presentations" U.S. patent application Ser. No. 10/034/149, which are incorporated herein by reference.

DESCRIPTION OF RELATED ART

As the volume of data accessible via computer continues to increase, the need for automated tools for efficient browsing and retrieval of relevant information from that data also increases. Many people use the Internet to access a wide variety of documents represented in many different formats, such as plain text, static images, animations, HTML-based web pages, MP3 audio, and video data. Specific information is very often found by the user through queries to search engines, which are remotely accessible programs that perform keyword or similarity searches for information on Internet data.

Unfortunately, it is not always easy for a user to maintain context when navigating within a large web site or viewing a document. The user may have difficulty keeping an overview of a document or collection of documents while focusing on detailed content. This situation is exacerbated when the user is equipped with hardware that has limited communication bandwidth or limited display area and resolution as is often the case with personal digital assistants (PDAs).

Several different schemes for scanning and selecting items in a graphical user interface are described in "The Alphaslider: A Compact and Rapid Selector" by C. Ahlberg and B. Shneiderman, Proceedings of ACM Conference on Human Factors in Computer Systems, Boston, Mass., USA, Apr. 24-28, 1994, pp. 365-371, which is hereby incorporated by reference. This paper recognizes the problem of displaying a large document having more points of interest than can be displayed at once in a display, i.e. when there are more items than available pixels. In this situation, the user needs to select which portions of a document are to be displayed with navigable resolution. The authors present different slider mechanisms to help a user select the granularity of the information displayed in a slider window. One mechanism features a scroll box slider bar having three different portions, with each portion designed to cause either coarse, medium, or fine motion of the slider bar when grasped by a user. Another mechanism selects granularity based on mouse movement speed. A third mechanism selects slider motion resolution by having the user move the mouse perpendicularly to the direction of slider bar movement. The authors report that users were confused by such non-intuitive combinations of mouse movement. Users were also generally frustrated by having to perform fine slider bar movements with the mouse while simultaneously holding down a mouse button.

An interface having a nonlinear slider scale is described in "TimeSlider: An Interface to Specify Time Point" by Y. Koike et al., Proceedings of the ACM Symposium on User Interface Software and Technology, $10^{th}$ Annual Symposium, UIST '97, 1997, pp. 43-44, which is hereby incorporated by reference. The TimeSlider interface uses a scale that is nonlinear (i.e. coarsely compressed) at both ends of the slider window, but that has a fine, linear scale in the center portion. This interface thus presents a fisheye view of a document (see also "Generalized Fisheye Views, by George W. Furnas, ACM Conference Proceedings on Human Factors in Computing Systems, April 1986, Boston Mass., pp. 16-23, which is hereby incorporated by reference). The scale depicts an indicated time span, and is described in the context of depicting a history of changes on a desktop. The user must grasp (i.e. select with a mouse button) and hold the slider bar for a specified time to enable the movement of a desired point on the timeline into the central linear region of the scale. A summary window appears when the user grasps the slider bar, and displays information about the desktop state or changes thereto. Small marks on the time scale can represent time points at which state changes occurred or points at which there are interesting items including search keywords.

Another noteworthy interface is described in "A Multi-Scale Timeline Slider for Stream Visualization and Control" by Heather A. Richter et al., Technical Report 99-30 available at the Georgia Tech College of Computing web site as ftp://ftp.cc.gatech.edu/pub/gvu/tr/1999/99-30.pdf, which is hereby incorporated by reference. This interface is designed for visualization and playback of long media streams decorated with significant events that can help pinpoint an exact location at which to begin playback of a stream. The article points out the difficulty of distinguishing clusters of events when the resolution level is limited, and notes that this difficulty is aggravated when nonlinear time scales are used. That is, a nonlinear time scale gives the illusion that everything in the past is significant by clustering all past events into one visible region in the interface. The interface described in the article requires the user to create "focus regions" to zoom in on a particular document span to try to resolve this clustering problem. The interface requires a user to right-mouse-click on a timeline to create a new, subordinate timeline that is a zoomed view of the focus region on the original timeline. Markers above the timeline depict locations of specified events. While the aforementioned prior art tools are useful advances in the field of information visualization, GUI tools that provide further ease of use could be developed. Such tools would be of interest to Internet users who must currently silt and scroll through large collections of potentially immense documents, sometimes with hardware of limited display, storage, and communication capability. Dynamic documents are of particular difficulty as they contain data from an ongoing process and must therefore somehow be updated and displayed without causing past points of interest to be clustered together indistinguishably. An improved system enabling visualization and navigation of dynamic documents while keeping the user within context is therefore needed.

SUMMARY OF THE INVENTION

It is accordingly an object of this invention to devise a system and method for concise visualization and easy navigation of dynamic documents while keeping the user within context. A dynamic document includes data from an ongoing process and contains instances of user-specified features which may include conventional search terms or keywords as well as events defined by significant changes in the data. A search engine can identify relevant documents and a document analysis and indexing tool can generate related document metadata.

The invention provides a summary view of at least one dynamic document upon user request. Collections of dynamic documents may also be similarly summarized. The summary view can be generated from the document itself or from the document metadata or both, and can be generated by a Java applet. The summary view depicts the distribution and frequency of search terms, as an exemplary indication of document relevance, within the document using a condensed abstract representation of the document. The invention continuously or periodically updates the summary view to reflect changes that occur in the document. Dynamic documents may include, for example, text files, image files, web pages, audio files, video files, and streaming data. There are many scenarios in which a stream of data is generated by an ongoing process. Emergency room equipment or other medical monitoring devices can generate patient data. A security system can generate an ongoing data stream from a number of cameras and other sensors. Similarly, theatrical performances and other such productions can generate data streams to be visualized and navigated. Computer networks, stock markets, and chat rooms can also produce volumes of dynamic data. The summary view can compute and depict a statistical summary of the contents of a portion of the dynamic document selected by a user.

In a preferred embodiment, the summary view comprises a rectangular arrangement of markers in which the columns of the arrangement correspond to the user-specified features such as search terms, and the rows correspond to different segments of the dynamic document. Alternately, the summary view may be horizontally oriented, so that rows correspond to features and the columns correspond to different segments of the dynamic document. The content of each marker (for example, the color or darkness of each marker) can represent the presence or absence of search terms, or the frequency with which search terms occur in the portion of the document represented by that particular marker, or other useful relevance measures. Similarly, the physical dimensions of the summary view may encode metadata values for the dynamic document.

The dynamic document is preferably represented in the condensed abstract representation by several distinct segments, each of which may have its own different resolution scale. A substantially nonlinear abstract representation of the document is depicted by using many different levels of resolution for corresponding segments of a dynamic document. Each segment may for example represent a span of time over which the ongoing process generated data to be viewed and navigated. Alternately, segments may be defined by properties of the data in the stream (for example, significant changes in a measured value). A segment depicting recent events may use a higher resolution scale than a segment depicting old events, as old events are often less significant than recent events. The summary view is preferably vertically oriented to more intuitively correspond with a stream of data, with the most recent data depicted at the bottom of the summary view and the data moving upward over time. Alternately, the summary view can be horizontally oriented to resemble a strip chart with data flowing from left to right over time. The summary view thus provides an immediate overview of the document as well as the distribution of interesting features throughout the document as an exemplary indication of document relevance.

It is a related object of the invention to more readily distinguish clusters of feature instances in a dynamic document. As data continues to stream in, and feature instances are moved into document segments having lower display resolution, the number of pixels available per search term instance declines. The invention avoids the distortion of depicted data in this situation by aggregating information in the summary view. The summary view can be included within a modified version of a dynamic document, or may be embodied as a fold-out window that appears to float above a displayed document.

It is a related object that different features such as search terms or term categories be depicted with different colors in the summary view when feasible to help the user maintain the context of the information visualization and navigation experience. A legend of the search terms or term categories in the different colors may help prevent user confusion.

It is a related object that the summary view utilizes cursor "brushing", the juxtaposition of a cursor near or over a marker, to trigger an enhancement of the summary view providing more detailed information. For example, a contextual snippet of information including a particular search term and several surrounding words from the particular portion of a document represented by a marker can be displayed when a user moves the cursor over that marker.

It is a related object that such visualization and navigation not rely on the use of conventional scrolling techniques as practiced with conventional web browsing programs, although the invention can be used with web browsers. Users may use the summary view to determine the context in which search terms occur in a document, and in response choose to directly navigate to a particular occurrence of a search term in the document. When the user clicks on a particular marker, the invention responsively scrolls the document so that the portion of the document corresponding to the marker is displayed, and data access begins from that point.

It is a related object that a hierarchy of summary views may be generated by the invention. Each summary view in the hierarchy depicts increasingly detailed summary information about portions of the document until finally a particular portion of the document is directly displayed.

It is a related object that the invention serves as an intermediary that enables intuitive visualization and navigation capabilities without causing distraction or confusion to users who are accustomed to conventional web browser use. It is a related object that the improved visualization and navigation means may be of particular utility to users of computer systems having limited storage, display, and communication capability. This is often the case with PDAs, personal information managers (PIMs) and cellular phones or other platforms incorporating microbrowsers.

It is a related object that the visualization and navigation system provide summary information about various features of documents that are linked to a document currently being displayed, without requiring that linked documents be prefetched in their entirety. This summary information may include thumbnails of other documents linked to the document currently being displayed, or indications of the presence and distribution of search terms in linked documents. The user may therefore choose whether to click on (and thus navigate to) a linked document based on the summary information. The summary information may also include a description of the number of accesses that have been made to the linked documents or portions thereof. For example, the darkness of depicted cells may correspond to the popularity of a document portion.

It is a related object that the invention enable improved visualization and navigation of video files. For example, each row in a summary view can correspond to a section of the video data selected by a segmentation tool. When a user brushes a cursor over a marker, the invention displays a video frame corresponding to the segment of video data represented by the marker. When the user clicks on a marker or video frame, the invention scrolls to the corresponding segment in the video data and begins playing the video in the display at the beginning of the selected segment. For video collections, a first hierarchical fold-out window may represent a plurality of videos, with subsequent fold-out windows in the hierarchy representing individual videos, and then segments of individual videos and so forth to a point where the video itself begins playing in the display. Alternately, the invention may display a storyboard comprising a plurality of video frames, possibly arranged in a serpentine fashion, with navigation enabled as described above. The foregoing objects are believed to be satisfied by the embodiment of the present invention as described below.

DETAILED DESCRIPTION OF THE PREFERRED EMBODIMENT

The typical invention use scenario begins with the user starting a web browser providing a graphical user interface, and then specifying features such as keywords or other search terms that are of interest. The graphical user interface may for example be generated by a digital computer, a personal digital assistant, a personal information manager, or a microbrowser application running on a cellular telephone. A search engine can provide links to documents that it discovers and deems relevant based on an analysis of the instances of search terms found in such documents. Search engines are generally known in the art and are readily familiar to persons looking for information in digital data stored in networks like the Internet. Of course, a user may select a document directly. Non-browser-based scenarios are also supported by the invention.

Documents may include text files, image files, web pages, audio files, and video files for example, as well as collections. A multimedia analysis and indexing tool, such as IBM's CueVideo toolkit, may generate document metadata, particularly for multimedia documents. For example, document metadata may include search terms, a textual transcript, the results of a textual transcript search, the results of a speaker change search, the results of a stress analysis, topic headings, the results of a topic change search, the results of a speech transcript search, audio features, the audio amplitude data, and the number of accesses to a particular document segment.

Documents are not necessarily static items. Dynamic documents include data from an ongoing process and therefore change with time. The features of interest may thus include user-specified events that are defined by significant changes in the data. Many data sources generate information on an ongoing basis that needs to be monitored for both current values and for emerging trends. Streaming data, an example of a kind of dynamic document, is becoming increasingly popular among Internet users as large multimedia documents are made available for distribution. Further examples of dynamic documents are given below. For such data sources, it is often necessary to show the user recent history and to enable the user to get detailed information about events occurring at a certain point in time. A historic overview is often necessary to provide the context to understand the current state. Time-varying data frequently shows characteristic recurring patterns and trends that are easy to miss if only the current data state is visible.

Figure 1:
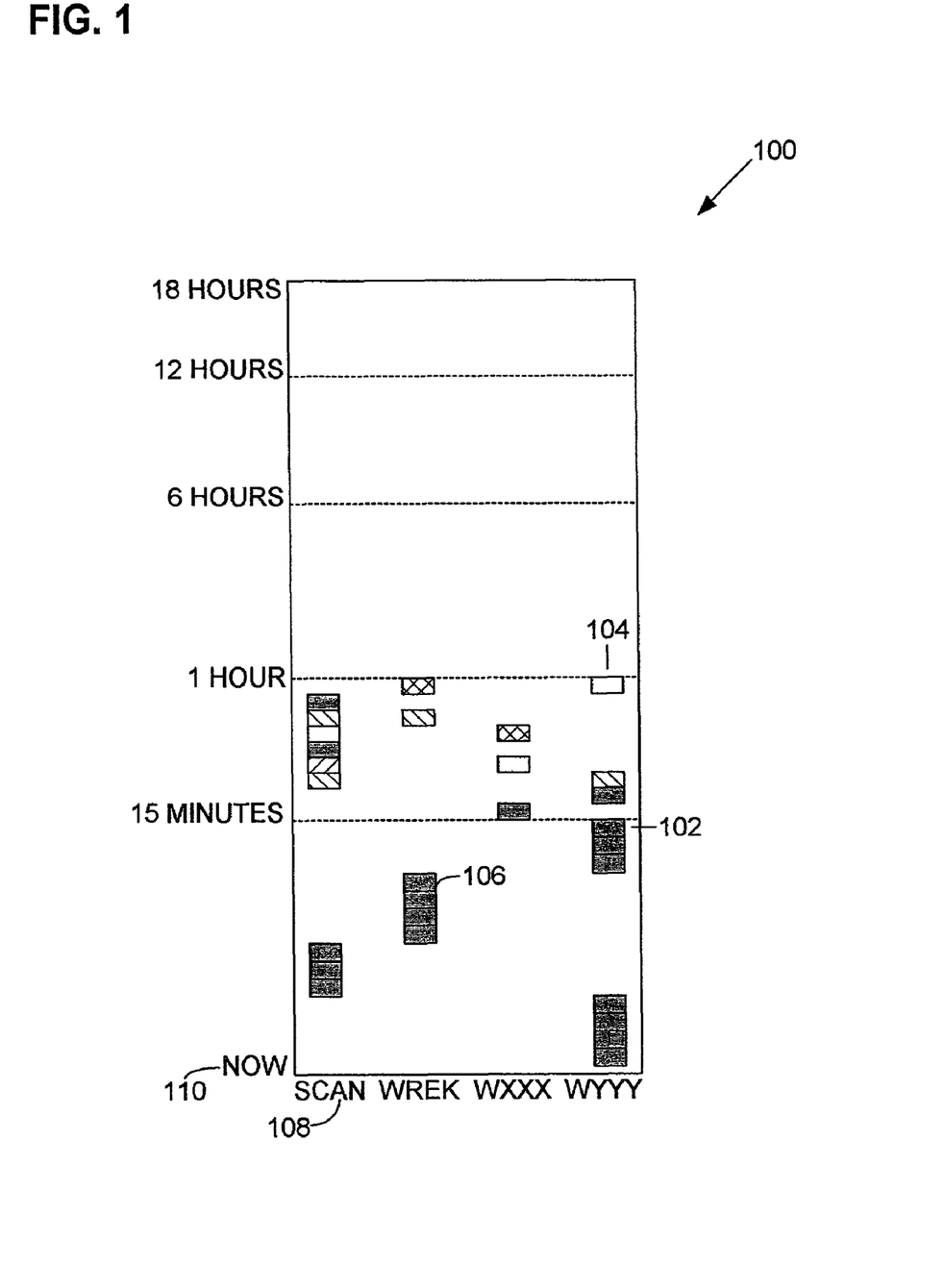
FIG. 1 is a diagram of the summary view of the preferred embodiment of the present invention.

Referring now to FIG. 1, a diagram of the summary view of the preferred embodiment of the present invention is shown. Summary view 100 is essentially a condensed abstract representation of at least one of the dynamic documents a user wishes to visualize and navigate. A Java applet can generate summary view 100 from the document itself, or from the document metadata, or both. Summary view 100 depicts the structure of the document, as well as the distribution and frequency of search terms within the document's various segments (which may be defined by an indexing tool or merely represent a straightforward segmentation of the document). The distribution and frequency information define a search term density distribution that a user would find useful when deciding whether to view and navigate a particular document's content. Summary view 100 can also depict other useful relevance measures.

Summary view 100 comprises rows 102, columns 104, and markers 106 in a rectangular arrangement. In this embodiment, rows 102 correspond to segments of the document and columns 104 correspond to the user-specified search terms 108. Alternately, rows 102 can correspond to the user-specified search terms 108 and columns 104 can correspond to segments of the document. Search terms 108 are displayed to help remind the user of column 104 meanings, helping to keep the user oriented and within the context of the information retrieval effort. Scale indicia 110 describe the range of data depicted by summary view 110. Each segment of summary view 110 can represent for example a span of time over which the ongoing process generated data to be viewed and navigated. As shown in FIG. 1, scale indicia 110 describe the time duration from the present to the arrival time of data depicted by markers 106 at various row 102 and column 104 locations. The lowest row 102 in FIG. 1 depicts the most recent data (e.g. "now"), and upper rows 102 depict increasingly older data (e.g. "15 minutes", "1 hour" etc.). Summary view 100 is preferably vertically oriented to more intuitively correspond with a stream of data as would be generated by a printer or teletype, with the most recent data depicted at the bottom of summary view 100 and older data moving upward over time. Alternately, summary view 100 can be horizontally oriented to resemble a strip chart with data flowing from left to right over time.

Summary view 100 preferably depicts a dynamic document as distinct segments in distinct representation regions, with each region having its own resolution scale. For example, in FIG. 1 the lowest region depicts data from "now" to "15 minutes" ago at a scale of approximately ten minutes per inch, while the next region up depicts data from "15 minutes" ago to "1 hour" ago at a scale of approximately 40 minutes per inch. Subsequent regions depict older data at even lower resolution, because older data tends to be less significant than recent data and thus deserves less area in the graphical user interface. A substantially nonlinear abstract representation of the document is therefore depicted by using many regions each having different levels of resolution for corresponding segments of a dynamic document. The invention updates summary view 100 to reflect changes that occur in the document. The invention may continuously update incoming dynamic document data and analyze the data for features of interest, which are then displayed in summary view 100. Alternately, the invention may update the dynamic document periodically, and then update its abstract representation in summary view 100.

In this instance, the search terms 108 describe how a radio listener spent a portion of listening time, e.g. either scanning through a list of streaming online radio stations ("SCAN") or listening to a particular one of three stations ("WREK", "WXXX" and "WYYY"). Here, rows 102 in the lowest segment each represent one minute of time, and the darkness of each marker 106 specifies how much of that minute was spent listening to a particular station.

More generally, the content of each marker 106 represents the frequency with which a particular search term 108 occurs in the portion of the document represented by that particular marker 106 positioned at a specific combination of row 102 and column 104. The relative darkness of each marker 106, or color according to a color legend, depicts the density of each search term 108. Alternately, different marker 106 patterns (e.g. dots, cross-hatching) may be assigned to represent different densities. Each search term 108 and markers 106 corresponding to that search term 108 can be displayed in a different color than other search terms 108 and their corresponding markers 108. Color coding can help the user maintain the context of the information visualization and navigation experience, and prevent user confusion. The physical dimensions of summary view 100 and its separate components may also encode metadata values; for example, search terms 108 not occurring frequently anywhere in the document may be represented by thin corresponding columns 104. Summary view 100 can be included within a modified version of a dynamic document, or may be embodied as a fold-out window that appears to float above a displayed document.

Summary view 100 thus provides an immediate overview of the document as well as the distribution of interesting features throughout the document as an exemplary indication of document relevance. The invention is designed to serve as an intermediary that enables intuitive visualization and navigation capabilities without causing distraction or confusion to users who are accustomed to conventional web browser use. Users of the invention can easily monitor the recent history of a monitored process and quickly navigate to a particular location of interest for more detail, to be described below.

The use of low resolution regions in summary view 100 can cause problems when there are more search terms 108 occurring than there are pixels available to assign so that each marker 106 gets at least one pixel. In other words, as data continues to stream in, and search term 108 instances are moved into document segments having lower display resolution, the number of pixels available per search term 108 instance declines. Clusters of search term 108 instances need to be distinguishable by a user as dynamic data moves between regions of different resolution.

The present invention avoids the confusion that could result from distortion of depicted data by aggregating information in summary view 100 as data is updated. As the data moves upward in summary view 100, it gets aggregated into a lower-resolution representation. Thus, search term 108 instances that are initially each depicted by their own markers 106 as point features are converted into aggregating features by the present invention. The representation of aggregating features is similar to that of point features, but the data displayed by markers 106 for aggregating features is cumulative for the span represented by a particular row 102.

For example, in FIG. 1, the first fifteen minutes of data are depicted with markers 106 having a one minute resolution, while the segment depicting data from 15 minutes to one hour in age uses markers 106 of five minute resolution. As data moves into the section with five minute resolution, five of the one-minute markers 106 get aggregated into a single five-minute marker. In other words, data represented by each of the five one-minute markers is summed and then appropriately represented by the single five-minute marker. Similarly, as data moves above the "1 hour" demarcation line, each marker 106 would depict the number of search term 108 instances occurring within say a fifteen minute span. This method of aggregation can keep markers 106 all the same size, which helps users interact with them more easily. Alternately, each marker 106 can depict a search term 108 frequency by normalizing each value depicted by a marker 106 to the span allocated to the particular row 102 in which marker 106 appears, e.g. data is converted to "events per pixel" and depicted accordingly.

Through aggregation, the present invention thus depicts not only direct data, such as the instances of search term 108 occurrences themselves, but metadata derived from direct data. If more than one level of aggregation is depicted, as when data moves above the "1 hour" demarcation line in this example, it may be adequate for the depicted metadata to be derived from first level aggregation metadata, versus keeping a large file of direct data available at all times. In other words, a summary of the direct data may itself be summarized as it scrolls into history.

Figure 2:
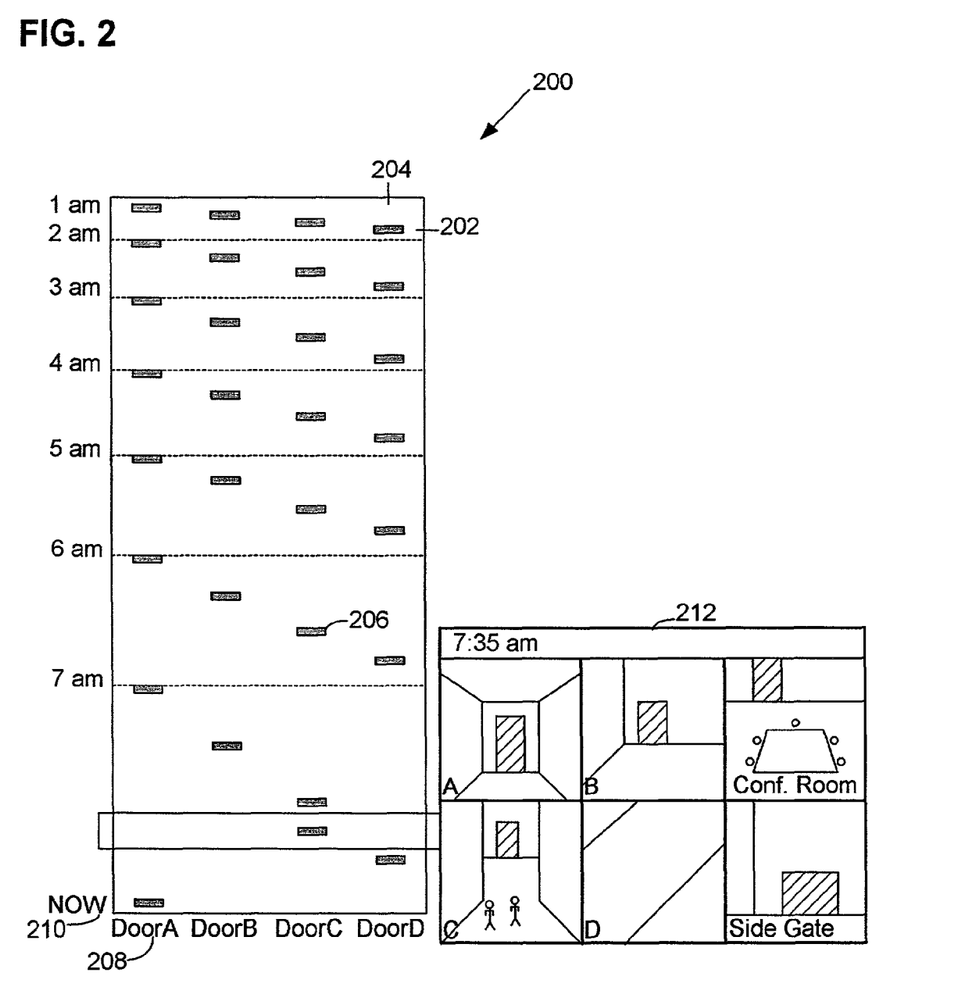
FIG. 2 is a diagram of the summary view of the preferred embodiment of the present invention in a security system scenario.

Referring now to FIG. 2, a diagram of the-summary view of the preferred embodiment of the present invention is shown in a security system scenario. As in the previous Figure, summary view 200 includes rows 202, columns 204, markers 206, search terms 208, and scale indicia 210 which in this case depict specific times (e.g. "now", "8 am", etc.). Search terms 208 here are the openings of various doors (e.g. "Door A", "Door B", etc.) as detected and reported by security sensors, and displayed by markers 206. When reviewing the security data, it is easy to discern whether a door was opened recently by the presence or absence of a marker 206. Detection of a deviation from a predictable event pattern is very easy with the present invention. The hourly tour of a guard through the building causes a regular pattern of door openings in the security data stream, so any missed checkpoint would be very distinctive.

Security systems also often use many surveillance cameras that need to be monitored. It is well known that even after short monitoring times, people easily miss events seen by the cameras. With the present invention, a user could easily detect changes in historical video data and responsively go back into the data stream for further investigation. For example, if two door openings are recorded in the data stream, a user could quickly check the video data to see if an intruder entered or if a guard merely backtracked momentarily to re-check a door.

The user triggers the creation of an enhancement 212 in the present invention by moving a cursor (not shown) in the graphical user interface near or over a particular marker 206. Enhancement 212 is an addition to summary view 200 providing more detailed information. The juxtaposition of a cursor near or on a graphical user interface target is termed "brushing" and is distinct from selection of that target by clicking a mouse button. Brushing requires less commitment from the user than target selection, and causes less confusion because brushing results are temporary and are usually 'undone' when the user moves the cursor away again. In this example, enhancement 212 includes a fold-out window that includes video frames or clips taken from several different cameras over a time span represented by a particular row 202 containing the brushed marker 206. Guide lines help the user stay in context by unobtrusively identifying the particular row 202 to which enhancement 212 corresponds. Highlighting of a marker 206 boundary in response to cursor proximity accomplishes a similar effect. In other examples, enhancement 212 may comprise a display of the first few words from a particular corresponding document segment, or a contextual snippet having a search term and a number of surrounding words to help the user determine how search term 208 relates to nearby document content.

If the user decides that the instance of search term 208 is likely to be of interest, then the user can navigate directly to that instance in the document by selecting the corresponding particular marker 206. For example, when the user clicks a mouse button to select a particular marker 206, the invention scrolls the document so that the portion of the document corresponding to that particular marker 206 is directly displayed. The present invention therefore does not rely on the use of conventional scrolling techniques as practiced with conventional web browsing programs for document navigation, although the invention is likely to be used with web browsers.

As described in detail in cross-referenced and incorporated-by-reference patent application "System and Method for Visualizing and Navigating Content in a Graphical User Interface", a hierarchy of summary views may be used to represent a very large amount of data. This is true for the dynamic documents described in this patent application as well as for the "fixed" documents described in that application. For example, summary view 200 depicts about eight hours of dynamic data from a security system. If a month of dynamic data needed to be visualized and navigated with similar precision, a single summary view 200 would probably not suffice. In that situation, the first summary view 200 in a hierarchy would for example depict the entire month, and a second summary view in a hierarchy of summary views generated in response to user commands would for example depict a particular day's data. In this manner, each subsequent representation in a hierarchy of representations depicts information at an increased resolution. Old data can be periodically archived into a "fixed" document.

Any task involving the monitoring of streaming data can benefit from use of the present invention, as it provides the user with a high level overview of the data and allows the user to access detailed data from a selected point in time. One application is to monitor patients in a hospital emergency room or intensive care unit. The dynamic document includes medical data about the patient like heart rate, blood pressure, respiration rate, temperature, the times and dosages of medications given, and other physician-defined parameters, and possibly images from a surveillance camera in the patient's room. If the summary view shows a sudden surge in heart rate, for example, it is a simple matter to check and see that the patient moved around or had a visitor at that point in time. Similarly, if a slow but steady change in some parameter occurs over time and thus might normally go unobserved, the change may be detected at a glance using the nonlinear time scale of the present invention. Unlike plotters that continuously trace parameters on long strips of paper, such as a cardiogram for example, the present invention collects all relevant data at one point (with current events and history in close proximity) and enables quick visualization and navigation to investigate what happened at a specific point in time. Another application is an awareness system for a work group, in which columns 204 represent group members and the features depict the status of a group member at a given time (in, out, at lunch, in a meeting, and so forth).

Figure 3:
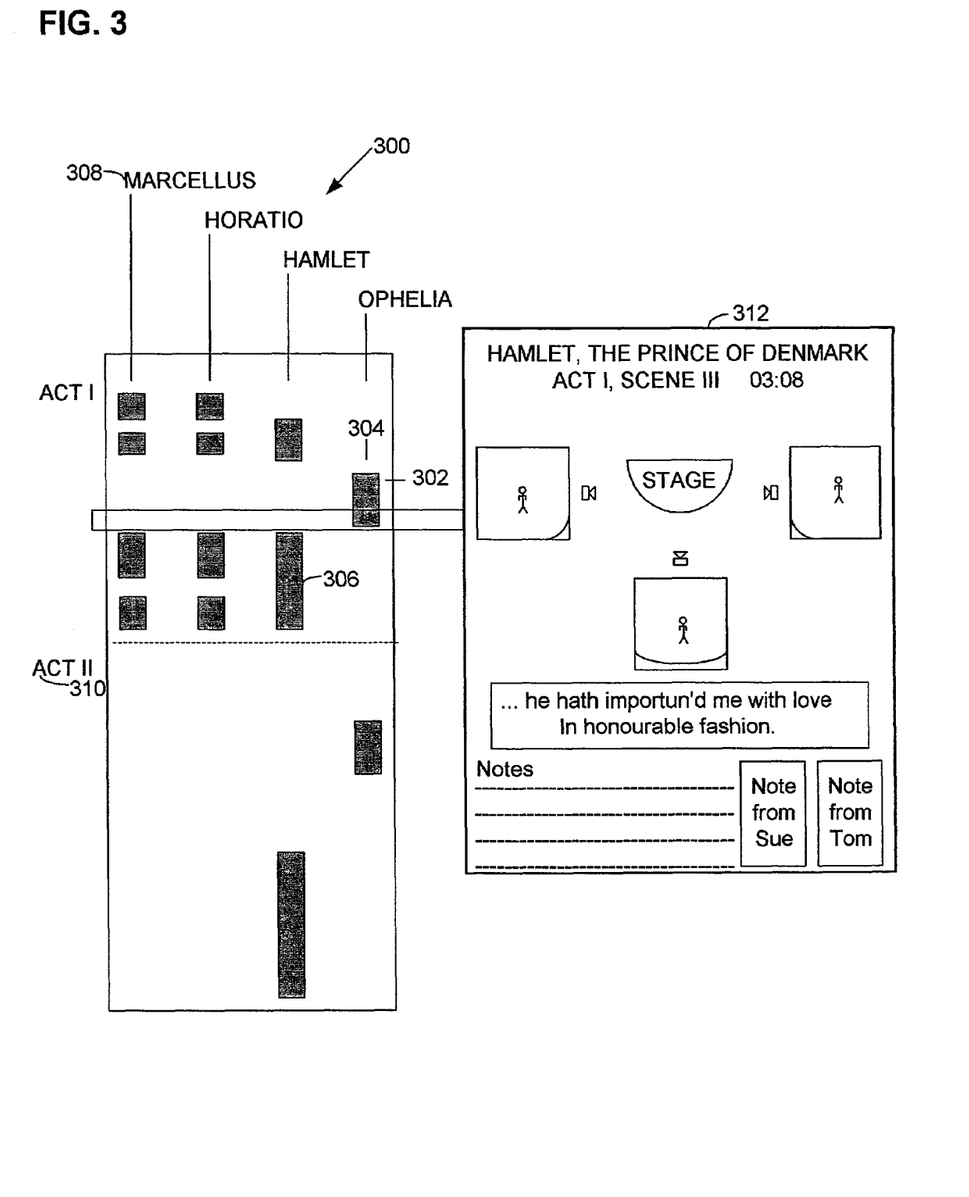
FIG. 3 is a diagram of the summary view of the preferred embodiment of the present invention in a theatrical performance scenario.

Referring now to FIG. 3, a diagram of the summary view of the preferred embodiment of the present invention in a theatrical performance scenario is shown. As in FIG. 2, summary view 300 includes rows 302, columns 304, markers 306, search terms 308, scale indicia 310, and an enhancement 312. In this case, scale indicia 310 describe acts and scenes, and search terms 308 describe the onstage presence or absence of different characters throughout the performance. Enhancement 312 is a fold-out window including video data from a number of cameras positioned throughout the theater, preferably oriented to present a coherent overall performance depiction to the user. Enhancement 312 can also include a text transcript of the performance, background materials, links for annotations, and other educational material. The dynamic document may thus include not only data from the performance but input from the audience.

Figure 4:
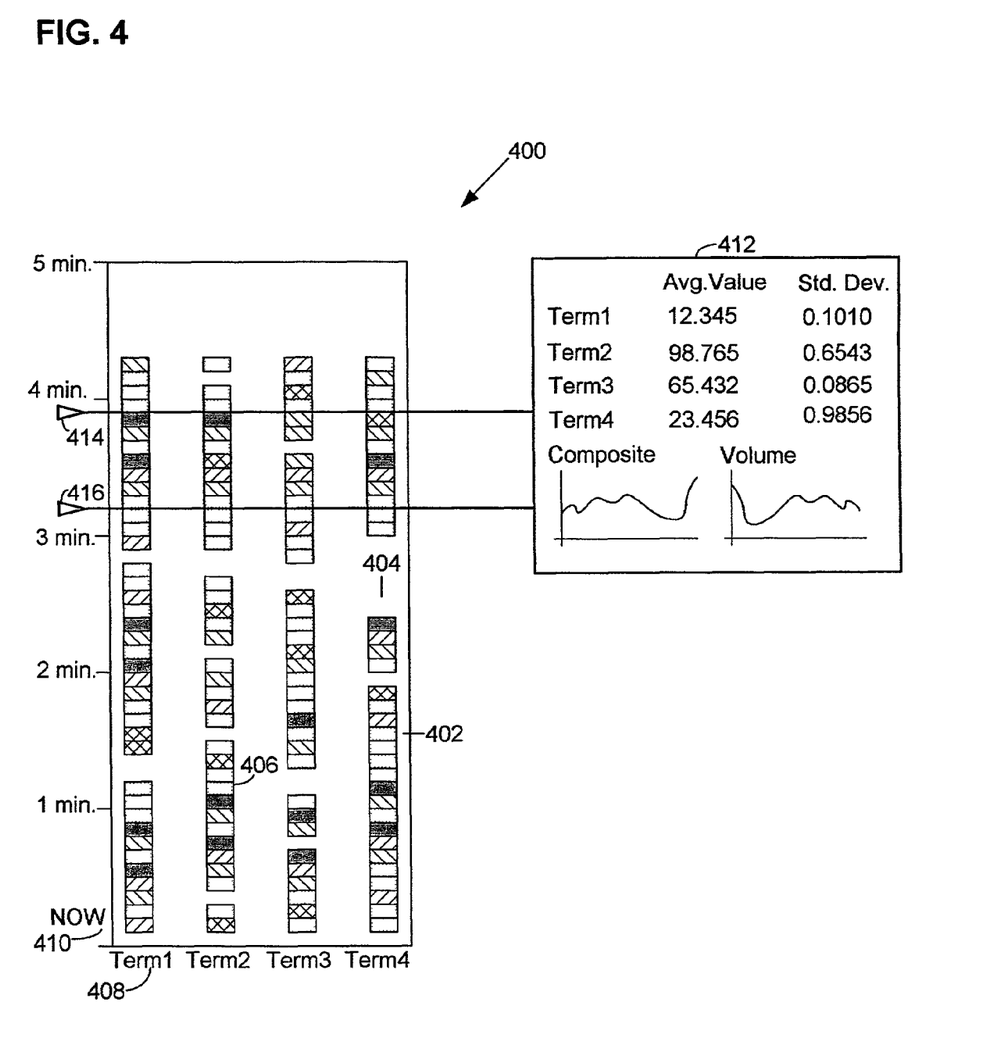
FIG. 4 is a diagram of the summary view of the preferred embodiment of the present invention including a statistical summary of a selected document portion.

Referring now to FIG. 4, a diagram of the summary view of the preferred embodiment of the present invention including a statistical summary of a selected document portion is shown. As in several previous Figures, summary view 400 includes rows 402, columns 404, markers 406, search terms 408, scale indicia 410 and an enhancement 412. This Figure relates to another application of the invention, which is to monitor web log files. Web servers continuously generate a huge amount of data that is typically analyzed only once a month or less. Trends in server usage will therefore be detected very late, and irregularities in server access, including denial of service attacks, might be detected too late. The present invention allows a user to see severe changes in the overall server access patterns by monitoring, for example, the number of pages accessed, the number of accesses to specific directories, the number of page updates, and the number of type 404 errors (attempted accesses to non-existing pages). A surge in type 404 errors might indicate a hacker attack. Span selectors 414 and 416 define a data range for which a statistical summary is computed by the invention and displayed in enhancement 412. Such a summary can be compared to a "baseline" summary to help detect anomalies in the dynamic document data. Similar comparisons can be made on stock market data.

The present invention can also depict activities in a textual chat room. Each participant is assigned to a column, so it becomes very easy to find all messages from a particular person. Private messages between only two people in the chat room could be shown in a different color. The span selection described above can be used to select a time range for which a transcript of the chat is to be written to a file. Similarly, the messages of some participants can be eliminated from the log by checking off corresponding columns prior to writing the file. Additional columns can indicate non-conversational messages, such as when people entered or left the chat room.

A general purpose computer is programmed according to the inventive steps herein. The invention can also be embodied as an article of manufacture—a machine component— that is used by a digital processing apparatus to execute the present logic. This invention is realized in a critical machine component that causes a digital processing apparatus to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device.

While the invention has been described with respect to an illustrative embodiment thereof, it will be understood that various changes may be made in the apparatus and means herein described without departing from the scope and teaching of the invention. Accordingly, the described embodiment is to be considered merely exemplary and the invention is not to be limited except as specified in the attached claims.

We claim:

1. A method for visualizing dynamic documents in a graphical user interface of a web browser, comprising:
    generating a summary view that depicts structure of a dynamic document from a data stream, the summary view including distribution and frequency of search terms, within segments of the dynamic document to indicate relevance of the dynamic document based on said search terms, the distribution and frequency of said search terms are represented using a condensed abstract representation of a search term density distribution, wherein:
        said condensed abstract representation comprises a marker selected from the group consisting of: color, pattern, and relative darkness, and
        said summary view comprises a plurality of rows, columns, and markers in a rectangular arrangement, each of said markers comprises content that represents frequency with which one of said search terms occur in a position of the dynamic document;
    updating said summary view to reflect changes that occur in said dynamic document from said data stream; and
    triggering an enhancement of said summary view by cursor brushing a particular marker, said enhancement providing additional information of the structure of the dynamic document.

2. The method of claim 1 further comprising navigating to at least one segment of said dynamic document by selecting a corresponding portion of said summary view.

3. The method of claim 1 further comprising computing a statistical summary of contents of a portion of a selected dynamic document.

4. The method of claim 1 further comprising identifying dynamic documents that are relevant to said search terms using at least one search engine.

5. The method of claim 1 further comprising aggregating information to enable a more condensed abstract representation of said dynamic document.

6. The method of claim 1 wherein said updating is performed periodically.

7. The method of claim 1 wherein said updating is performed continuously.

8. The method of claim 1, wherein at least one segment of said dynamic document is navigated to by selection of a corresponding portion of said summary view.

9. The method of claim 1, wherein said search terms include user-specified events defined by significant changes in said distribution and frequency from said data stream.

10. The method of claim 1, wherein said summary view comprises a number of distinct regions, each region having a different resolution scale, enabling information to be depicted at different levels of detail.

11. The method of claim 10, wherein said resolution scale is a time scale.

12. The method of claim 1, wherein said abstract representation is nonlinear.

13. The method of claim 1, wherein said summary view depicts more recent events with higher resolution than less recent events.

14. A computer program product for visualizing dynamic documents in a graphical user interface of a web browser, the computer program product comprising a computer readable storage medium having computer-executable program instructions embodied therewith:
    first code instructions for generating a summary view that depicts structure of a dynamic document from a data stream, the summary view including distribution and frequency of search terms within segments of the dynamic document to indicate relevance of the dynamic document based on said search terms, the distribution and frequency of said search terms are represented using a condensed abstract representation of a search term density distribution, wherein:
        said condensed abstract representation comprises a marker selected from the group consisting of: color, pattern, and relative darkness, and
        said summary view comprises a plurality of rows, columns, and markers in a rectangular arrangement, each of said markers comprises content that represents frequency with which one of said search terms occur in a position of the dynamic document;
    second code instructions for updating said summary view to reflect changes that occur in said dynamic document from said data stream; and
    third code instructions for triggering an enhancement of said summary view by cursor brushing a particular marker, said enhancement providing additional information of the structure of the dynamic document.

15. The computer program product of claim 14, further comprising:
    fourth code instructions for navigating to at least one segment of said dynamic document by selecting a corresponding portion of said summary view.

16. The computer program product of claim 14, further comprising:
    fourth code instructions for computing a statistical summary of contents of a portion of a selected dynamic document.

17. The computer program product of claim 14, further comprising:
    fourth code instructions for identifying dynamic documents that are relevant to said search terms using at least one search engine.

18. The computer program product of claim 14, further comprising:
    fourth code instructions for aggregating information to enable a more condensed abstract representation of said dynamic document.

19. The computer program product of claim 14, wherein said updating is performed periodically.

20. The computer program product of claim 14, wherein said updating is performed continuously.

21. The computer program product of claim 14, wherein at least one segment of said dynamic document is navigated to by selection of a corresponding portion of said summary view.

22. The computer program product of claim 14, wherein said search terms include user-specified events defined by significant changes in said distribution and frequency from said data stream.

23. The computer program product of claim 14, wherein said summary view comprises a number of distinct regions, each region having a different resolution scale, enabling information to be depicted at different levels of detail.

24. The computer program product of claim 23, wherein said resolution scale is a time scale.

25. The computer program product of claim 14, wherein said abstract representation is nonlinear.

26. The computer program product of claim 14, wherein said summary view depicts more recent events with higher resolution than less recent events.

* * * * *